(12) United States Patent
Oliver et al.

(10) Patent No.: US 9,081,839 B2
(45) Date of Patent: Jul. 14, 2015

(54) PUSH REPLICATION FOR USE WITH A DISTRIBUTED DATA GRID

(75) Inventors: Brian Oliver, Acton, MA (US); Noah Arliss, Lexington, MA (US)

(73) Assignee: ORACLE INTERNATIONAL CORPORATION, Redwood Shores ( * ) Notice: Subject to any disclaimer, the term of this patent is extended or adjusted under 35 U.S.C. 154(b) by 494 days.

(21) Appl. No.: 13/360,487

(22) Filed: Jan. 27, 2012

(65) Prior Publication Data

US 2012/0197840 A1 Aug. 2, 2012

Related U.S. Application Data

(60) Provisional application No. 61/437,550, filed on Jan. 28, 2011.

(51) Int. Cl.
G06F 7/00 (2006.01)
G06F 17/30 (2006.01)

(52) U.S. Cl.
CPC .................. *G06F 17/30575* (2013.01)

(58) Field of Classification Search
None
See application file for complete search history.

(56) References Cited

U.S. PATENT DOCUMENTS

| | | | |
|---|---|---|---|
| 5,784,569 A | 7/1998 | Miller et al. | |
| 5,819,272 A * | 10/1998 | Benson | 1/1 |
| 5,940,367 A | 8/1999 | Antonov | |
| 5,987,506 A | 11/1999 | Carter | |
| 5,988,847 A | 11/1999 | McLaughlin | |
| 5,991,894 A | 11/1999 | Lee et al. | |
| 5,999,712 A | 12/1999 | Moiin et al. | |
| 6,182,139 B1 | 1/2001 | Brendel | |
| 6,304,879 B1 | 10/2001 | Sobeski | |
| 6,377,993 B1 | 4/2002 | Brandt | |
| 6,487,622 B1 | 11/2002 | Coskrey, IV et al. | |
| 6,490,620 B1 | 12/2002 | Ditmer | |
| 6,615,258 B1 | 9/2003 | Barry | |
| 6,631,402 B1 | 10/2003 | Devine | |
| 6,693,874 B1 | 2/2004 | Shaffer et al. | |
| 6,714,979 B1 | 3/2004 | Brandt | |
| 6,772,203 B1 | 8/2004 | Feiertag | |
| 6,968,571 B2 | 11/2005 | Devine | |
| 7,114,083 B2 | 9/2006 | Devine | |
| 7,139,925 B2 | 11/2006 | Dinker et al. | |
| 7,266,822 B1 | 9/2007 | Boudnik | |
| 7,328,237 B1 | 2/2008 | Thubert | |
| 7,376,953 B2 | 5/2008 | Togasaki | |
| 7,464,378 B1 | 12/2008 | Limaye | |
| 7,543,046 B1 | 6/2009 | Bae et al. | |

(Continued)

*Primary Examiner* — Jeffrey A Burke
(74) *Attorney, Agent, or Firm* — Tucker Ellis LLP (57) ABSTRACT

Push replication techniques are described for use in an in-memory data grid. When applications on a cluster perform insert, update or delete operations in the cache, a push replication provider asynchronously pushes updates from the source cluster to one or more remote destination clusters. The push replication provider includes a pluggable internal transport to send the updates to the destination cluster. This pluggable transport can be switched to employ a different communication service or protocol. A publishing transformer can chain multiple filters and apply filters on a stream of updates from source cluster to the destination cluster. A batch publisher can be used to receive batches multiple updates and replicate those batch to the destination cluster. XML based configuration can be provided to configure the push replication techniques on a cluster. A number of cluster topologies can be utilized, including active/passive, active/active, multi-site active/passive, multi-site active/active and centralized replication arrangement.

20 Claims, 7 Drawing Sheets

(56) References Cited

U.S. PATENT DOCUMENTS

| | | |
|---|---|---|
| 7,574,706 B2 | 8/2009 | Meulemans et al. |
| 7,698,390 B1 | 4/2010 | Harkness |
| 7,711,920 B2 | 5/2010 | Borman et al. |
| 7,720,971 B2 | 5/2010 | Moutafov |
| 7,739,677 B1 | 6/2010 | Kekre et al. |
| 7,792,977 B1 | 9/2010 | Brower et al. |
| 7,814,248 B2 | 10/2010 | Fong et al. |
| 7,953,861 B2 | 5/2011 | Yardley |
| 8,195,835 B2 | 6/2012 | Ansari |
| 8,209,307 B2 | 6/2012 | Erofeev |
| 8,312,439 B2 | 11/2012 | Kielstra et al. |
| 2002/0035559 A1 | 3/2002 | Crowe et al. |
| 2002/0073223 A1 | 6/2002 | Darnell |
| 2002/0078312 A1 | 6/2002 | Wang-Knop et al. |
| 2002/0087630 A1 | 7/2002 | Wu |
| 2003/0023898 A1 | 1/2003 | Jacobs |
| 2003/0046286 A1 | 3/2003 | Jacobs |
| 2003/0120715 A1 | 6/2003 | Johnson et al. |
| 2003/0187927 A1 | 10/2003 | Winchell |
| 2003/0191795 A1 | 10/2003 | Bernardin |
| 2003/0229674 A1 | 12/2003 | Cabrera |
| 2004/0025071 A1 | 2/2004 | Vicard |
| 2004/0059805 A1 | 3/2004 | Dinker et al. |
| 2004/0172626 A1 | 9/2004 | Jalan |
| 2004/0179471 A1 | 9/2004 | Mekkittikul et al. |
| 2004/0205148 A1 | 10/2004 | Bae |
| 2004/0267897 A1 | 12/2004 | Hill et al. |
| 2005/0021737 A1 | 1/2005 | Ellison et al. |
| 2005/0083834 A1 | 4/2005 | Dunagan et al. |
| 2005/0097185 A1 | 5/2005 | Gibson |
| 2005/0138460 A1 | 6/2005 | McCain |
| 2005/0193056 A1 | 9/2005 | Schaefer |
| 2006/0095573 A1 | 5/2006 | Carle |
| 2006/0248285 A1 | 11/2006 | Petev |
| 2007/0016822 A1 | 1/2007 | Rao et al. |
| 2007/0118693 A1 | 5/2007 | Brannon et al. |
| 2007/0140110 A1 | 6/2007 | Kaler |
| 2007/0174160 A1* | 7/2007 | Solberg et al. .................. 705/35 |
| 2007/0237072 A1 | 10/2007 | Scholl |
| 2007/0260714 A1 | 11/2007 | Kalmuk |
| 2007/0271584 A1 | 11/2007 | Anderson et al. |
| 2008/0109599 A1 | 5/2008 | Smith |
| 2008/0183876 A1 | 7/2008 | Duvur et al. |
| 2008/0276231 A1 | 11/2008 | Huang et al. |
| 2008/0281959 A1 | 11/2008 | Robertson |
| 2009/0265449 A1 | 10/2009 | Krishnappa et al. |
| 2009/0320005 A1 | 12/2009 | Toub et al. |
| 2010/0128732 A1 | 5/2010 | Jiang |
| 2010/0211931 A1 | 8/2010 | Levanoni |
| 2010/0312861 A1 | 12/2010 | Kolhi et al. |
| 2011/0041006 A1* | 2/2011 | Fowler ........................ 714/10 |
| 2011/0107135 A1 | 5/2011 | Andrews et al. |
| 2011/0126173 A1 | 5/2011 | Tzoref et al. |
| 2011/0161289 A1* | 6/2011 | Pei et al. ...................... 707/613 |
| 2011/0179231 A1 | 7/2011 | Roush |
| 2011/0249552 A1 | 10/2011 | Stokes et al. |
| 2012/0117157 A1 | 5/2012 | Ristock |
| 2012/0158650 A1* | 6/2012 | Andre et al. .................. 707/611 |
| 2012/0215740 A1* | 8/2012 | Vaillant et al. ............... 707/634 |

* cited by examiner

PUSH REPLICATION FOR USE WITH A DISTRIBUTED DATA GRID

CLAIM OF PRIORITY

The present application claims the benefit of U.S. Provisional Patent Application No. 61/437,550, entitled "PUSH REPLICATION IN A DISTRIBUTED DATA GRID," by Bob Hanckel et al., filed on Jan. 28, 2011, which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This patent application is related to the following U.S. patent application, which is incorporated by reference herein in its entirety:

U.S. patent application Ser. No. 13/359,396, entitled "EVENT DISTRIBUTION PATTERN FOR USE WITH A DISTRIBUTED DATA GRID", by Brian Oliver et al., filed on Jan. 26, 2012.

FIELD OF THE INVENTION

The current invention relates to data storage in distributed computing environments and in particular to distributing updates and data replication between computer clusters.

BACKGROUND

In recent years, the amount of information utilized by various organizations, businesses and consumers has exploded to reach enormous amounts. From enterprise resource planning (ERP) to customer resource management (CRM) and other systems, more and more parts of an organization are becoming optimized, thereby producing vast amounts of data relevant to the organization. All of this information needs to be collected, stored, managed, archived, searched and accessed in an efficient, scalable and reliable manner.

Historically, most enterprises have utilized large databases to store the majority of their data and used random access memory (RAM) to locally cache a subset of that data that is most frequently accessed. This has been done mainly to conserve costs since RAM has traditionally been faster but more expensive than disk-based storage. Over time, RAM has been continuously growing in storage capacity and declining in cost. However, these improvements have not kept up with the rapid rate of increase in data being used by enterprises and their numerous applications. In addition, because CPU advancements have generally outpaced memory speed improvements, it is expected that memory latency will become a bottleneck in computing performance.

Organizations today need to predictably scale mission-critical applications to provide fast and reliable access to frequently used data. It is desirable that data be pushed closer to the application for faster access and greater resource utilization. Additionally, continuous data availability and transactional integrity are needed even in the event of a server failure.

An in-memory data grid can provide the data storage and management capabilities by distributing data over a number of servers working together. The data grid can be middleware that runs in the same tier as an application server or within an application server. It can provide management and processing of data and can also push the processing to where the data is located in the grid. In addition, the in-memory data grid can eliminate single points of failure by automatically and transparently failing over and redistributing its clustered data management services when a server becomes inoperative or is disconnected from the network. When a new server is added, or when a failed server is restarted, it can automatically join the cluster and services can be failed back over to it, transparently redistributing the cluster load. The data grid can also include network-level fault tolerance features and transparent soft re-start capability.

BRIEF SUMMARY

In accordance with various embodiments of the invention, a set of push replication techniques are described for use in an in-memory data grid. When applications on a cluster perform insert, update or delete operations in the cache, the push replication provider can asynchronously push updates of those data entries from the source cluster to a remote destination cluster over a wide area network (WAN). The push replication provider includes a pluggable internal transport to send the updates to the destination cluster. This pluggable transport can be switched to employ a different communication service and store/forward semantics. The embodiments further include a publishing transformer that can apply filters and chain multiple filters on a stream of updates from the source cluster to the destination cluster. A batch publisher can be used to receive batches multiple updates and replicate those batch to the destination cluster. XML based configuration can be provided to configure the push replication techniques on the cluster. The described push replication techniques can be applied in a number of cluster topologies, including active/passive, active/active, multi-site active/passive, multi-site active/active and centralized replication arrangement.

DETAILED DESCRIPTION

In accordance with various embodiments, a set of push replication techniques are described for computers that store data in an in-memory data grid. In accordance with an embodiment, the data grid is a system composed of multiple servers that work together to manage information and related operations—such as computations—in a distributed environment. An in-memory data grid then is a data grid that stores the information in memory to achieve higher performance and uses redundancy by keeping copies of that information synchronized across multiple servers to ensure resiliency of the system and the availability of the data in the event of server failure. The data grid is used as a data management system for application objects that are shared across multiple servers, require low response time, high throughput, predictable scalability, continuous availability and information reliability. As a result of these capabilities, the data grid is ideally suited for use in computational intensive, stateful middle-tier applications. The data management is targeted to run in the application tier, and is often run in-process with the application itself, for example in the application server cluster. In accordance with an embodiment, the data grid software is middleware that reliably manages data objects in memory across a plurality of servers and also brokers the supply and demand of data between applications and data sources. In addition, the data grid can push the processing of requests closer to the data residing in the grid. Rather than pulling the necessary information to the server that will be executing the process, the data grid can push the processing of the request to the server that is storing the information locally. This can greatly reduce latency and improve data access speeds for applications.

In accordance with an embodiment, push replication is a framework for synchronizing information between data grid clusters over a network which can include wide area networks (WANs) or metropolitan area networks (MANs). Push replication operates by "pushing" updates occurring in a source cluster to a destination cluster in a transparent and asynchronous manner. An example of using push replication could be implemented between multiple auction sites in New York and London. In this example, push replication could be used to push bids between both sites to keep both sites synchronized, meaning having the same data. In accordance with an embodiment, push replication solves several problems including but not limited to disaster recovery (providing a back-up at a remote cite), offloading read-only queries (providing one cluster dedicated to read/write operations with the read-only operations offloaded to another cluster), and providing local access to global data. Additional examples and use cases for push replication include Active/Passive (read/write and read-only) sites, Hub/Spoke model of Active/Passive sites, and Active/Active cites as will be described in further detail later in this document. A conflict resolution feature resolves conflicts in information when simultaneous updates occur in different active clusters on the same relative information.

In accordance with an embodiment, push replication also includes: 1) declarative configuration that is transparent to applications; 2) an event distribution service that is pluggable (a developer can plug a custom or 3rd party event distribution service into the push replication provider); 3) push replication is configurable to push updates to other services (e.g. file systems); and 4) publish entries can be easily filtered and coalesced using a custom filter class written by the application or by using declarative conditioning expressions embedded in the declarative XML (e.g. price <100).

Figure 1:
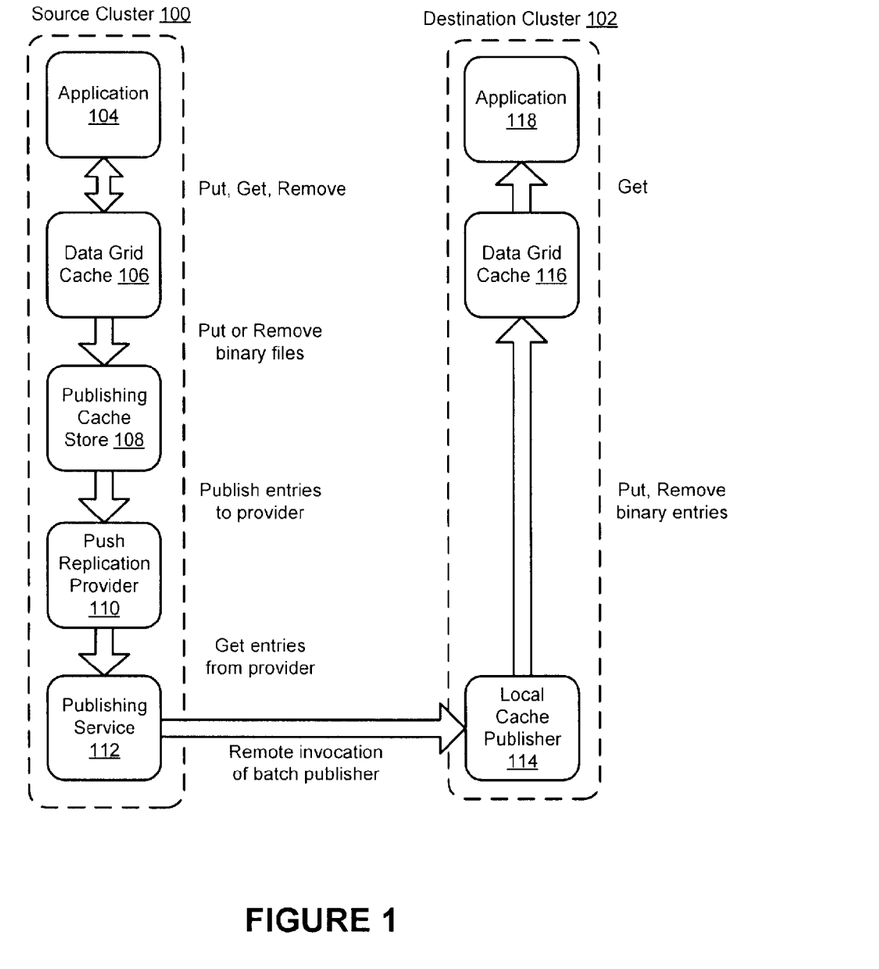
FIG. 1 is an illustration of push replication in accordance with various embodiments of the invention.

FIG. 1 is an illustration of the push replication feature in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, from the point of view of the application, the push replication is performed transparently, without the application having to be aware of it. The application 104 can simply perform its put, get and remove operations against the data grid cache 106 and the synchronization (push replication) is performed in the background. In particular, in the background, the publishing cache store 108, the push replication provider 110 and the publishing service 112 are aware of the put/get/remove operations and perform the push replication accordingly. These components work together to gather updates in the source cluster 100 and transmit those updates to the destination cluster 102. Applications 118 in the destination cluster then simply see the updates happen automatically.

In accordance with an embodiment, the publishing cache store 108 detects that an update has occurred in the data grid cache 106 and wraps that update with a set of information to create an entry operation. In accordance with an embodiment, the entry operation includes the data entry, the type of operation that was performed on that entry (e.g. insert, update, delete), and any additional metadata that can be used to perform replication, such as conflict resolution on the data, origin of the operation and the like. Once the publishing cache store has created the entry operation, it instructs the underlying push replication provider 110 to publish the operation.

In accordance with an embodiment, the push replication provider 110 places the operation on a topic, which the publishing service 112 is registered to listen to. The push replication provider 110 can utilize a number of messaging schemes, such as the Java Messaging Service (JMS) or a custom messaging protocol to communicate the updates to the destination cluster. In accordance with an embodiment, the push replication provider 110 is pluggable such that a user can select which messaging scheme to use and plug into the push replication framework. The push replication provider 110 is thus responsible for placing the entry operation that needs to be replicated onto any internal transport mechanism that is required to provide the store and forward semantics. The store and forward semantics can ensure that each entry operation is kept in a queue such that in the event of a connection between the clusters is lost, the entry operation will remain on the queue and will eventually be replicated once the connection comes back.

In accordance with an embodiment, the push replication provider 110 is an interface that includes method invocations including but not limited to registerPublisher( ) establishPublishingInfrastructure( ) and publish( ). In accordance with an embodiment, the publisher can be a batch publisher that can publish batches of updates (entry operations) at a time.

The publishing service 112 can be a live processing thread residing on the active cluster 100 which listens for updates and replicates them to the local cache publisher 114 in the destination cluster 102. In accordance with an embodiment, there is one or more running instances of the publishing service for each destination. If the publishing service fails, it can be automatically restarted on another node in the active cluster, such that the application is fault tolerant.

The local cache publisher 114 reads the entry operations received from the active cluster, performs conflict resolution on these entry operations and writes them to the local data grid cache 116 on the passive cluster 102. The local data grid cache 116 is available for access to any local application 118 deployed on the destination cluster.

In accordance with an embodiment, the push replication framework can further include a publishing transformer. The publishing transformer can be used to apply a set of filters to the stream of data being replicated out to another cluster. For example, if only some of the entries in the cache should be replicated out, the publishing transformer can filter out those entries that do not fulfill the criteria for replication. In another example, one could use the publishing transformer to strip the entries of data and only replicate the fact that the entries arrived in the cache. Therefore, any updates made to an entry would be published (replicated) in the same order unless the publishing transformer is used to mutate the entry operations prior to publishing.

In accordance with an embodiment, the publishing transformer can include a coalescing publishing transformer, a filtering transformer and a chaining transformer. The coalescing transformer that filters out all updates for an entry except for the last update in the batch on that data entry. Therefore, rather than consuming the network bandwidth to send multiple operations on the same update, the coalescing transformer only sends the last update operation. The filtering transformer can apply filters to filter out certain entries that do not fulfill the replication requirements. The chaining transformer can chain multiple transformers or multiple filters. For example, the chaining transformer can be used to chain the coalescing transformer with the filtering transformer in order to filter out certain entries in a batch, as well as transmit only the last updates for those entries that matched the filter.

In accordance with an embodiment, the push replication can be declaratively configurable within the data grid. Developers can use extensible markup language (XML) declarations within the data grid configuration files to configure how the push replication works. A push replication namespace is added to the configuration files for the data grid which can be used to configure the functionality of push replication. For example, a user can specify in the configuration which publishers should be used by push replication, which cache should be replicated to which destination and the like.

Figure 2:
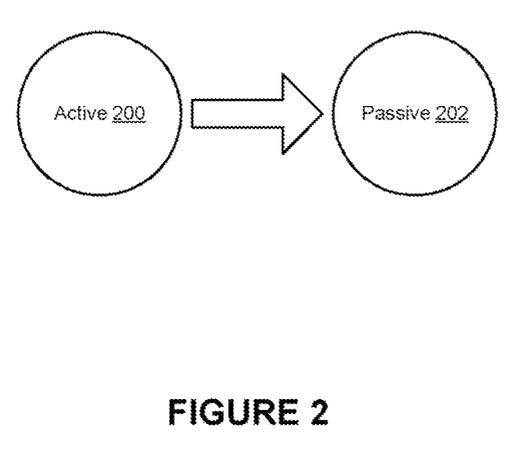
FIG. 2 is an illustration of the active/passive deployment of push replication, in accordance with various embodiments of the invention.

FIGS. 2-6 illustrate the various topologies of push replication between clusters, in accordance with various embodiments of the invention. FIG. 2 illustrates the active/passive deployment of push replication. This is the simplest topology, similar to the one illustrated in FIG. 1, where the active cluster 200 hosts the read/write applications and the passive cluster 202 contains read-only applications. Here, one primary active cluster is being updated in real time and the passive backup cluster is slightly behind (because of the push replication being asynchronous) however can also be used as a query engine.

Figure 3:
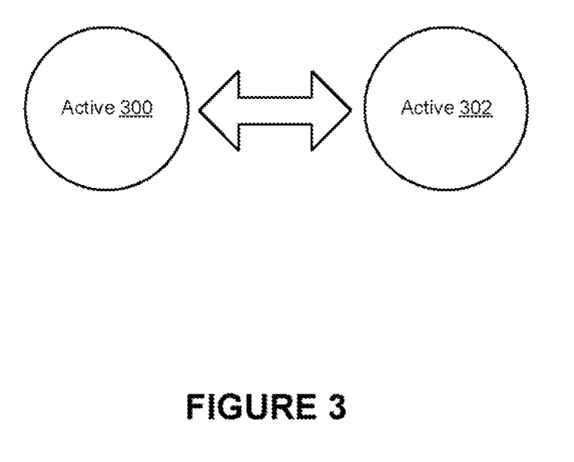
FIG. 3 is an illustration of the active/active deployment of push replication in accordance with various embodiments of the invention.

FIG. 3 is an illustration of the active/active deployment of push replication in accordance with various embodiments of the invention. In this topology, there are bi-directional updates being asynchronously transmitted between both active clusters 300 and 302. One possible use case for this could be two trader sites, one in New York and one in London and both trading platforms wish to know what the other site is up to. Another use case could be a disaster recovery situation where if one of the active clusters goes down, the other is available to take over the processing of requests in a live manner. The failover cluster can then immediately take over the failed cluster with a very close approximation of the data that was on the original cluster. When the failed cluster comes back online, it can synchronize with the failover cluster via this active/active topology and resume processing the requests as before the failure. The active/active topology can allow multiple clusters to support read/write applications. This permits overlapping writes on the same entry. In accordance with an embodiment, applications register a conflict resolver class which detects overlapping writes and provides in-flight resolution. In accordance with an embodiment, conflict resolution includes at least three options: keep the source entry, keep the target entry or merge the source and target entries. The active/active use case can support multiple activity across multiple clusters.

Figure 4:
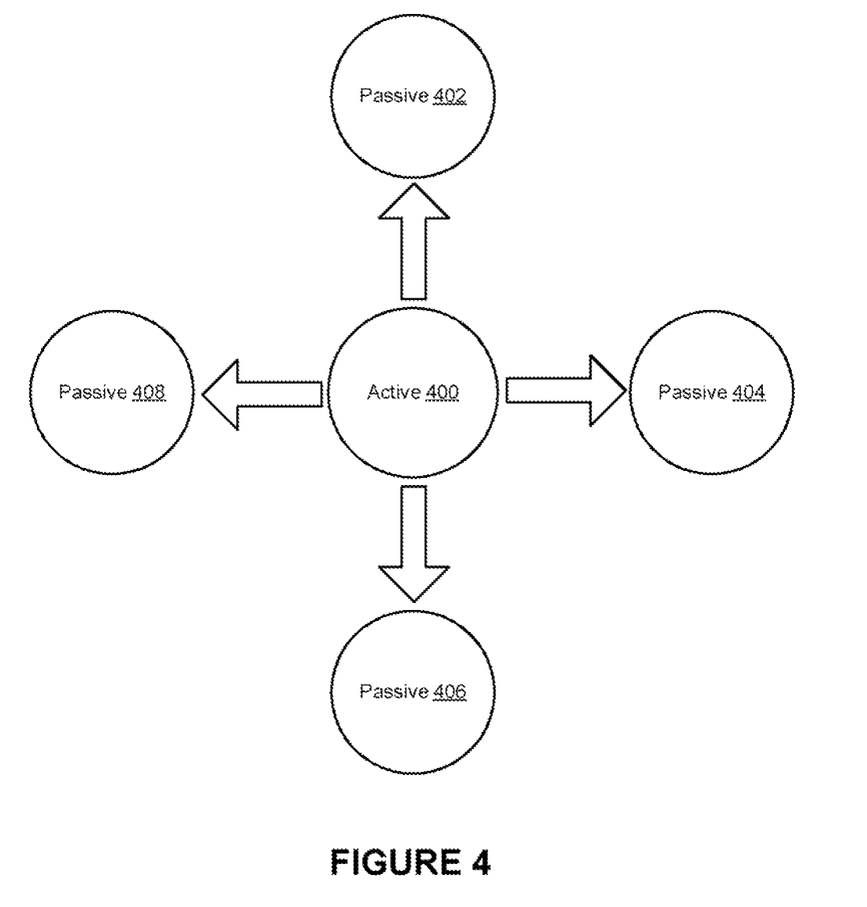
FIG. 4 is an illustration of the multi-site "hub spoke" active/passive deployment of push replication, in accordance with various embodiments of the invention.

FIG. 4 is an illustration of the multi-site "hub spoke" active/passive deployment of push replication, in accordance with various embodiments of the invention. In this topology, there is one centralized cluster 400 that is replicating its data out to a set of multiple additional clusters 402, 404, 406, 408. This deployment is similar to the one illustrated in FIG. 2, except that there is a set of multiple passive clusters rather than just one. The hub and spoke model is often useful in publishing scenarios where a publishing house wishes to have all of the publication data available at multiple sites available for query without the need to request the data over a wide area network (WAN) such as the Internet.

Figure 5:
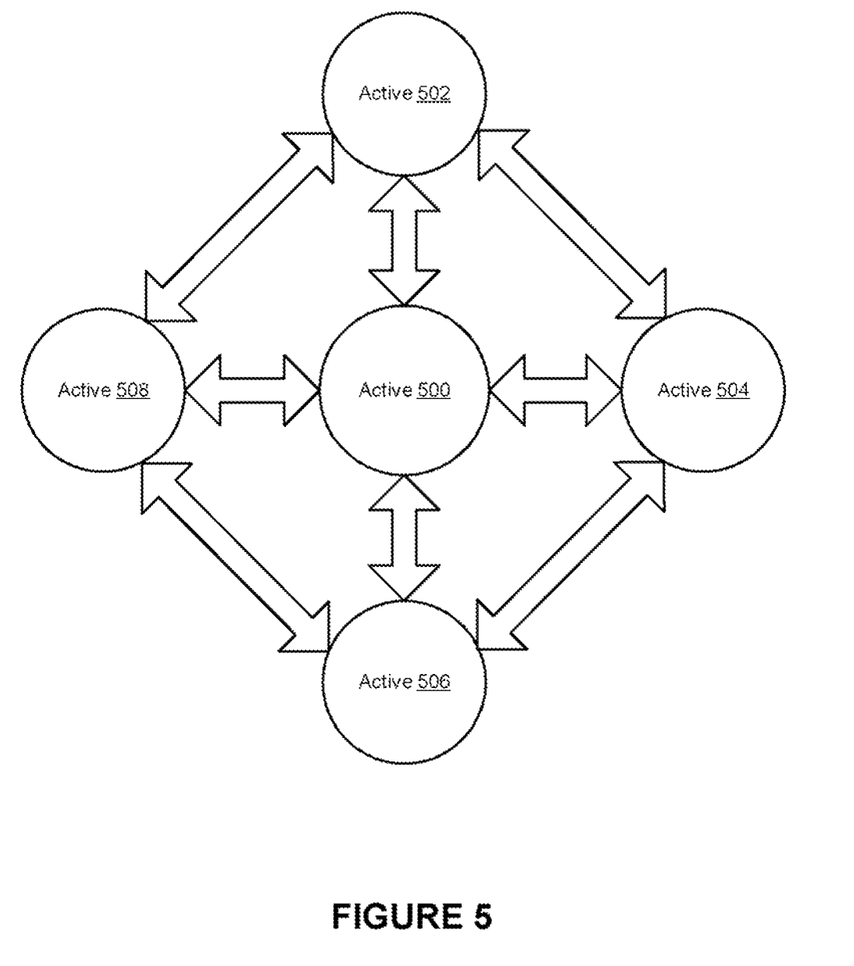
FIG. 5 is an illustration of a multi-site active/active deployment of push replication, in accordance with various embodiments of the invention.

FIG. 5 is an illustration of a multi-site active/active deployment of push replication, in accordance with various embodiments of the invention. In this topology, all clusters 500, 502, 504, 506, 508 are actively replicating their information to each of the other clusters. This arrangement is similar to the one illustrated in FIG. 3 with the difference being that there are multiple clusters and each cluster is replicating their data to all other clusters.

Figure 6:
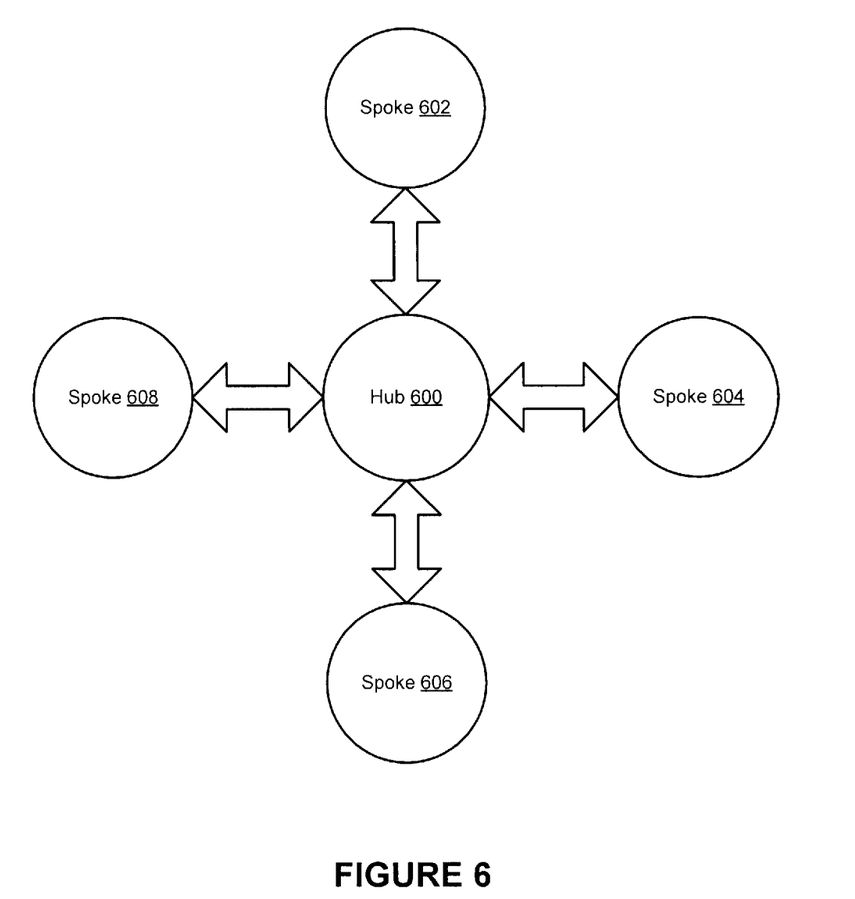
FIG. 6 is an illustration of centralized replication deployment of push replication in accordance with various embodiments of the invention.

FIG. 6 is an illustration of centralized replication deployment of push replication in accordance with various embodiments of the invention. In this topology, there is a centralized hub 600 that is distributing all of the spokes 602, 604, 606, 608 (similar to the topology illustrated in FIG. 4) however in this centralized replication, the spokes are also actively publishing their respective information back to the central hub 600. As such, each of the spoke clusters 602, 604, 606, 608 have an active connection to one and only one other cluster 600. This deployment can be contrasted with multi-site active/active deployment in that in the centralized replication deployment uses one centralized hub and all of the spoke clusters replicate their updates only to the central hub and not to each other. The central hub then is responsible for replicating these updates to all of the spoke clusters. By way of example, if the central hub was the New York cluster and there was an update in the Singapore cluster, the Singapore cluster would actively replicate its information to the New York cluster first and then the New York cluster would actively replicate that information to all remaining destinations (e.g. Hong Kong, London, Taipei, etc.).

Figure 7:
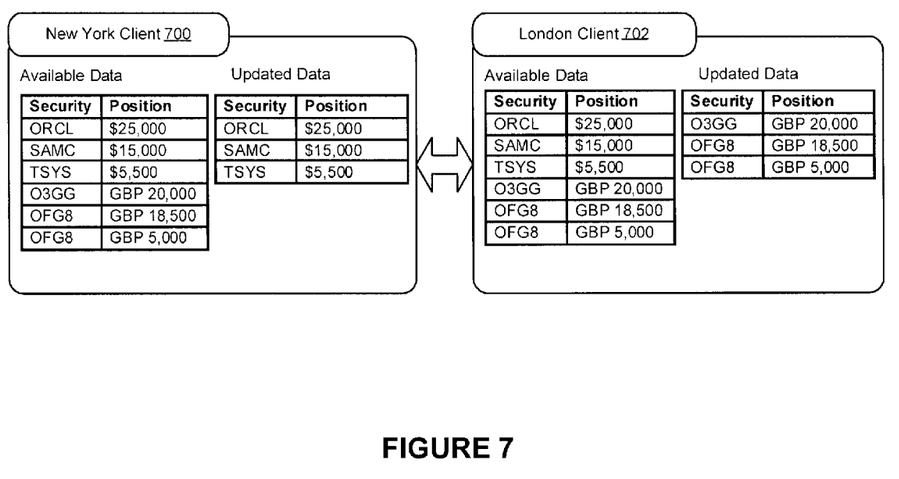
FIG. 7 is an illustration of another use case of push replication, in accordance with various embodiments of the invention.

FIG. 7 is an illustration of another use case of push replication, in accordance with various embodiments of the invention. As illustrated, a mutually exclusive update strategy use case is a hybrid of the active/active and active/passive configurations discussed above. In this use case, multiple clusters can update the same cache, however, mutual exclusion is enforced at the application logic. This means that only particular clusters can update particular entries in the cache. The rules for this are configurable in the data grid. As shown in this illustration, both the New York client 700 and the London client 702 contain the same available data, however, the New York client 700 is restricted to updating only a subset of all available data (e.g. the NY data) and the London client 702 is similarly restricted (e.g. to London data). In accordance with an embodiment, the mutually exclusive update enforcement is particularly useful in the centralized replication topology illustrated in FIG. 6.

In addition to the topologies illustrated above, there can be a composition of several topologies between separate clients. For example, while the cluster at the New York client can be an active/passive deployment and the London client can implement its local cluster as a active/passive deployment, the topology between the New York and London clusters can be an active/active topology. Similarly, the two clients may deploy their local clusters as hub/spoke deployments, while the topology between the clusters may be active/active. Various other combinations of such topologies are possible within the scope of the embodiments described herein.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for providing push replication in distributed computing environments, said system comprising:
   a source cluster of computer servers that manage a set of data and operations on said data in a distributed computing environment, said source cluster including a cache storing a set of data entries and an application residing on at least one server in said source cluster, said application executing one or more insert, update or delete operations on said data entries in the cache, wherein the source cluster maintains a connection to a destination cluster over a network;
   a publishing cache store residing in the source cluster, wherein the publishing cache store determines that an update has been performed on a data entry in the cache and provides the update to the push replication provider, wherein the push replication provider places the update on a topic;
   a publishing service residing on the source cluster, wherein said publishing service subscribes to said topic, reads the update and transmits the update to the destination cluster; and
   a push replication provider that asynchronously pushes the update on the data entries from the source cluster to the destination cluster, said update being caused by the application executing the one or more insert, update or delete operations in the cache, wherein the push replication provider includes a pluggable internal transport to send the update to the destination cluster, wherein said internal transport can be switched.

2. The system of claim 1, wherein the push replication provider operates to plug in any internal transport mechanism that provides store and forward semantics;
   wherein the store and forward semantics ensure that each update is kept in a queue such that in the event of a lost connection between the clusters, the update remains on the queue and is replicated once the connection is reestablished.

3. The system of claim 1, wherein the destination cluster further comprises:
   a local cache publisher that reads updates received from the push replication provider, performs conflict resolution on said updates and writes said updates to a local cache on the destination cluster.

4. The system of claim 1, further comprising:
   a batch publisher that receives a batch of a plurality of said updates and replicates said batch to the destination cluster.

5. The system of claim 1, further comprising:
   a publishing transformer that applies at least one filter to a stream of said updates such that only the updates that pass through said filter are replicated from the source cluster to the destination cluster.

6. The system of claim 5, wherein the publishing transformer composes a chain of a plurality of filters and applies said chain of filters to the stream of updates from the source cluster to the destination cluster.

7. The system of claim 1, wherein the source cluster and the destination cluster form an active/active topology, wherein the destination cluster asynchronously pushes updates to the source cluster and the source cluster asynchronously pushes updates to the destination cluster.

8. The system of claim 1, further comprising:
   a plurality of spoke clusters, wherein the source cluster is designated a hub cluster and wherein the hub cluster actively pushes the updates to the plurality of spoke clusters and wherein each of the plurality of spoke clusters push updates only to the hub cluster.

9. The system of claim 1, further comprising:
a plurality of additional clusters wherein each of the plurality of additional clusters actively pushes updates to each other cluster.

10. A method for providing push replication in distributed computing environments, said method comprising:
storing a set of data entries in a cache located on a source cluster of computer servers that manage a set of data and operations on said data in a distributed computing environment, wherein said source cluster further includes an application residing on at least one server in said source cluster, said application executing one or more insert, update or delete operations on said data entries in the cache;
establishing a connection to a destination cluster of computer servers over a network;
detecting that an update has been performed on a data entry in the cache, wherein the update is caused by the one or more insert, update or delete operations on said data entries;
providing the update to a push replication provider, wherein the push replication provider places the update on a topic;
subscribing to the topic by a publishing service residing on the source cluster, wherein said publishing service reads the update;
applying one or more filters to the update; and
asynchronously pushing, via a pluggable internal transport on the push replication provider, the update from the source cluster to the destination cluster when said update passes the one or more filters, wherein the pluggable internal transport can be switched.

11. The method of claim 10, wherein the push replication server operates to plug in any pluggable internal transport mechanism that provides store and forward semantics;
wherein the store and forward semantics ensure that each update is kept in a queue such that in the event of a lost connection between the clusters, the update remains on the queue and is replicated once the connection is reestablished.

12. The method of claim 10, wherein the destination cluster further comprises:
a local cache publisher that reads updates received from the source cluster, performs conflict resolution on said updates and writes said updates to a local cache on the destination cluster.

13. The method of claim 10, further comprising:
receiving a batch of a plurality of said updates by a batch publisher and replicating said batch to the destination cluster.

14. The method of claim 10, further comprising:
composing a chain of a plurality of said filters and applying said chain of filters to a stream of updates from the source cluster to the destination cluster.

15. The method of claim 10, wherein the source cluster and the destination cluster form an active/active topology, wherein the destination cluster asynchronously pushes updates to the source cluster and the source cluster asynchronously pushes updates to the destination cluster.

16. The method of claim 10, further comprising:
providing a plurality of spoke clusters, wherein the source cluster is designated a hub cluster and wherein the hub cluster actively pushes the updates to the plurality of spoke clusters and wherein each of the plurality of spoke clusters push updates only to the hub cluster.

17. The method of claim 10, further comprising:
providing a plurality of additional clusters wherein each of the plurality of additional clusters actively pushes updates to each other cluster.

18. A non-transitory computer readable storage medium storing a set of instructions executable by one or more processors to perform a sequence of steps comprising:
storing a set of data entries in a cache located on a source cluster of computer servers that manage a set of data and operations on said data in a distributed computing environment, wherein said source cluster further includes an application residing on at least one server in said source cluster, said application executing one or more insert, update or delete operations on said data entries in the cache;
establishing a connection to a destination cluster of computer servers over a network;
detecting that an update has been performed on a data entry in the cache, wherein the update is caused by the one or more insert, update or delete operations on said data entries;
providing the update to a push replication provider, wherein the push replication provider places the update on a topic;
subscribing to the topic by a publishing service residing on the source cluster, wherein said publishing service reads the update;
applying one or more filters to the update; and
asynchronously pushing, via a pluggable internal transport on the push replication provider, the update from the source cluster to the destination cluster when said update passes the one or more filters, wherein the pluggable internal transport can be switched.

19. The A non-transitory computer readable storage medium of claim 18, wherein the push replication server operates to plug in any pluggable internal transport mechanism that provides store and forward semantics;
wherein the store and forward semantics ensure that each update is kept in a queue such that in the event of a lost connection between the clusters, the update remains on the queue and is replicated once the connection is reestablished.

20. The A non-transitory computer readable storage medium of claim 18, wherein the destination cluster further comprises:
a local cache publisher that reads updates received from the source cluster, performs conflict resolution on said updates and writes said updates to a local cache on the destination cluster.

* * * * *

UNITED STATES PATENT AND TRADEMARK OFFICE
CERTIFICATE OF CORRECTION

Page 1 of 1

PATENT NO. : 9,081,839 B2
APPLICATION NO. : 13/360487
DATED : July 14, 2015
INVENTOR(S) : Oliver et al.

It is certified that error appears in the above-identified patent and that said Letters Patent is hereby corrected as shown below:

In the claims

Column 9, line 30, Claim 10, delete "applying one or more filters to the update; and".

Column 9, lines 31-32, Claim 10, delete ", via a pluggable internal transport on the push replication provider,".

Column 9, lines 33-35, Claim 10, delete "when said update passes the one or more filters, wherein the pluggable internal transport can be switched".

Column 10, line 36, Claim 18, delete "update;" and insert -- update from the topic; and --, therefor.

Column 10, line 37, Claim 18, delete "applying one or more filters to the update; and".

Column 10, lines 38-39, Claim 18, delete ", via a pluggable internal transport on the push replication provider,".

Column 10, lines 40-42, Claim 18, delete "when said update passes the one or more filters, wherein the pluggable internal transport can be switched." and insert -- . --, therefor.

Column 10, line 43, Claim 19, delete "The A" and insert -- The --, therefor.

Column 10, line 52, Claim 20, delete "The A" and insert -- The --, therefor.

Signed and Sealed this
Seventeenth Day of May, 2016

Michelle K. Lee
*Director of the United States Patent and Trademark Office*